United States Patent
Peng et al.

(10) Patent No.: US 10,565,924 B2
(45) Date of Patent: Feb. 18, 2020

(54) METHOD FOR DETERMINING SCENE CURRENTLY DISPLAYED ON TERMINAL AND TERMINAL

(71) Applicant: Guangdong Oppo Mobile Telecommunications Corp., Ltd., Dongguan, Guangdong (CN)

(72) Inventors: Deliang Peng, Guangdong (CN); Shengjun Gou, Guangdong (CN); Yongpeng Yi, Guangdong (CN); Xiaori Yuan, Guangdong (CN); Gaoting Gan, Guangdong (CN); Zhiyong Zheng, Guangdong (CN); Hai Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 44 days.

(21) Appl. No.: 15/709,121

(22) Filed: Sep. 19, 2017

(65) Prior Publication Data
US 2018/0261145 A1   Sep. 13, 2018

(30) Foreign Application Priority Data
Mar. 10, 2017   (CN) .......................... 2017 1 0142487

(51) Int. Cl.
*G06F 3/041* (2006.01)
*G06F 3/045* (2006.01)
(Continued)

(52) U.S. Cl.
CPC ......... *G09G 3/2092* (2013.01); *G06F 1/3203* (2013.01); *G06F 1/3206* (2013.01);
(Continued)

(58) Field of Classification Search
CPC ... G06F 3/04842; G06F 19/00; G06F 3/04847
See application file for complete search history.

(56) References Cited

U.S. PATENT DOCUMENTS

| 2015/0333964 A1* | 11/2015 | Wang ..................... G06F 1/3203 709/224 |
| 2015/0348493 A1 | 12/2015 | Chae et al. |
| 2016/0004304 A1* | 1/2016 | Kim ........................ G06F 3/013 345/649 |

FOREIGN PATENT DOCUMENTS

| CN | 103984538 A | 8/2014 |
| CN | 104038558 A | 9/2014 |

(Continued)

OTHER PUBLICATIONS

International Search Report issued in corresponding international application No. PCT/CN2017/101280 dated Dec. 15, 2017.
(Continued)

*Primary Examiner* — Nan-Ying Yang
(74) *Attorney, Agent, or Firm* — Young Basile Hanlon & MacFarlane, P.C.

(57) ABSTRACT

A method for determining a scene currently displayed on a terminal and a terminal are provided. The method includes obtaining parameters for determining a scene currently displayed on the terminal, and determining the scene currently displayed on the terminal based on the parameters. The parameters include one or more process identifiers of a currently running application and sensing data provided by one or more sensors of the terminal.

7 Claims, 6 Drawing Sheets

Figure 1:
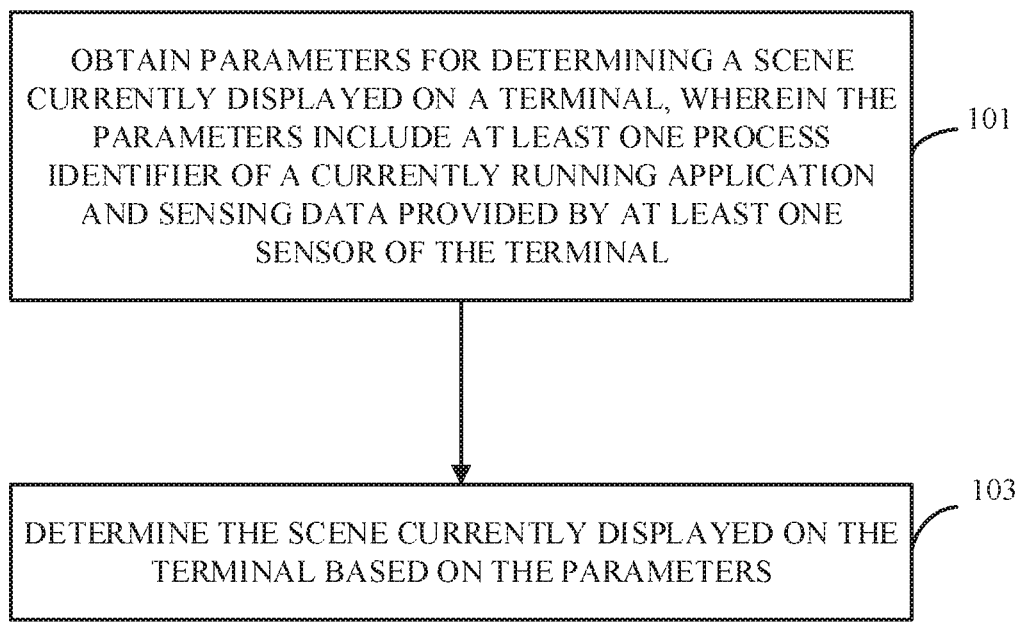

(51) Int. Cl.
  *G09G 3/20*      (2006.01)
  *G06F 11/30*     (2006.01)
  *G06F 1/3203*    (2019.01)
  *G06F 1/3206*    (2019.01)
  *G06F 1/3215*    (2019.01)
  *H04M 1/725*     (2006.01)

(52) U.S. Cl.
  CPC .......... *G06F 1/3215* (2013.01); *G06F 3/0412* (2013.01); *G06F 11/3013* (2013.01); *G06F 11/3055* (2013.01); *G06F 11/3062* (2013.01); *G06F 11/3089* (2013.01); *G06F 11/3096* (2013.01); *G09G 2320/0626* (2013.01); *G09G 2330/021* (2013.01); *H04M 1/72569* (2013.01)

(56) References Cited

FOREIGN PATENT DOCUMENTS

| | | |
|---|---|---|
| CN | 104199734 A | 12/2014 |
| CN | 104731543 A | 6/2015 |
| CN | 104820537 A | 8/2015 |
| CN | 106020844 A | 10/2016 |
| CN | 106201417 A | 12/2016 |
| EP | 2950203 A1 | 12/2015 |

OTHER PUBLICATIONS

Extended European search report issued in corresponding European application No. 17188944.7 dated Mar. 29, 2018.

* cited by examiner

METHOD FOR DETERMINING SCENE CURRENTLY DISPLAYED ON TERMINAL AND TERMINAL

CROSS-REFERENCE TO RELATED APPLICATION(S)

This application claims priority to Chinese Patent Application No. 201710142487.0, filed on Mar. 10, 2017, the content of which is hereby incorporated by reference in its entirety.

TECHNICAL FIELD

The present disclosure relates to terminals, and particularly to a method for determining a scene currently displayed on a terminal and a terminal.

BACKGROUND

Presently, terminals such as smart phones may include various applications, thus various scenes (a game scene, a chatting scene, and so on) may be displayed on the terminals. When different scenes are displayed, the power consumption may be different, that is to say, displayed scenes are closely related to power management. Therefore, there is a need to provide a solution to determine which scene is currently displayed on the terminal.

BRIEF DESCRIPTION OF THE DRAWINGS

In order to illustrate the technical solutions of the implementations of the present disclosure more clearly, the drawings used in the description of the implementations will be briefly described, it will be apparent that the drawings described in the following are implementations of the present disclosure, and it will be apparent to those skilled in the art that other drawings can be obtained from the drawings without any creative work.

FIG. 1 is a flowchart of a method for determining a scene currently displayed on a terminal in accordance with an implementation of the present disclosure.

FIG. 2 is a schematic view showing a display process in accordance with an implementation of the present disclosure.

FIG. 3 is a schematic view showing a Vsync display refresh mechanism in accordance with an implementation of the present disclosure.

FIG. 4 is a flowchart of a method for determining a scene currently displayed on a terminal in accordance with another implementation of the present disclosure.

FIG. 5 is a block diagram of a terminal in accordance with an implementation of the present disclosure.

FIG. 6 is a structural view of a terminal in accordance with an implementation of the present disclosure.

DETAILED DESCRIPTION

In order to illustrate the technical solutions of the present disclosure or the related art more clearly, a brief description of the accompanying drawings used herein is given below. Obviously, the drawings listed below are only examples, and a person skilled in the art should be noted that, other drawings can also be obtained on the basis of these exemplary drawings without creative work.

In the following description, numerous specific details are set forth in order to facilitate a thorough understanding of the present disclosure, however, the present disclosure can be practiced otherwise than as specifically described herein, and therefore, the scope of the present disclosure is not to be limited to the specific implementations disclosed below.

FIG. 1 is a flowchart of a method for determining a scene currently displayed on a terminal in accordance with an implementation of the present disclosure. The terminal may be a mobile phone, a smart watch, a tablet computer, a personal digital assistant, a digital multimedia player, or the like. The operating system of the terminal may be the Android system, the Windows Phone operating system, the Linux system, the IOS system, or the like. The method may include the follows.

At block 101, parameters for determining a scene currently displayed on the terminal are obtained. The parameters may include one or more process identifiers of a currently running application and sensing data provided by one or more sensors of the terminal.

A certain function such as a game function of an application may be realized by one or more processes. By means of one or more process identifiers of an application, a current function may be determined. Thus, one or more process identifiers of the currently operating application may be employed to determine the scene currently displayed on the terminal.

In the implementation, the terminal may include a number of sensors, for example, a distance sensor, a light sensor, an acceleration sensor, a direction sensor, a gyroscope, a temperature sensor, a humidity sensor, and so on. The sensing data provided by one or more of the sensors may be employed to determine the scene currently displayed on the terminal.

In at least one implementation, the one or more sensors which sensing data may be employed to determine the scene currently displayed on the terminal may be selected based on the type of the currently running application. For example, when the currently running application is a game application, the gyroscope may be selected. When sensing data provided by the gyroscope indicates that the terminal is rotated dramatically, it may indicate that the currently displayed scene is a fighting scene. For another example, when the currently running application is an application including multiple functions such as a chatting function, a gaming function, and so on, the gyroscope and the acceleration sensor may be employed. When sensing data provided by the gyroscope and the acceleration sensor indicates that the terminal is substantially not moved, it may indicate that the currently displayed scene is a chatting scene.

At block 103, the scene currently displayed on the terminal is determined based on the parameters.

In the implementation, by means of the one or more process identifiers of the currently running application and the sensing data provided by the one or more sensors of the terminal, the scene currently displayed on the terminal can be determined.

In at least one alternative implementation, the parameters may further include touch data provided by a touch device of the terminal. The touch device may be a touch panel, a touch screen, or a combination thereof. Different touch events may be determined based on the touch data. For example, the touch events may include a non-touch event, a quick touch event, a slow touch event, and so on. The non-touch event may be that no touch is performed. The quick touch event may be that a finger slides across the touch device quickly. The slow touch event may be that a finger slides across the touch device slowly. The scene currently displayed on the terminal may be determined based on the one or more process identifiers of the currently running application, the sensing data provided by the one or more sensors of the terminal, and the sensing data provided by the touch device of the terminal. For example, when the currently running application is a game application, the gyroscope is selected. When it indicates that the terminal is substantially not rotated based on the sensing data provided by the gyroscope and it also indicates that no touch is performed according to the touch data, it may indicate that the scene currently displayed on the terminal is a scene for illustrating a game rather than a fighting scene.

In at least one alternative implementation, the parameter may further include one or more layer properties of the currently running application. The layer properties may include layer identifiers, whether there is cache data, a landscape or portrait mode, properties of visible regions, properties of transparent regions, whether there are update regions, properties of update regions, image information, and so on.

For a layer, when there is no cache data in a corresponding cache region, it indicates that the layer is a blank layer. For layers having the same name or the same numbers, an application draws the layers in a certain drawing speed. A currently received layer (a layer received within a preset time) is compared with a previously drawn layer to determine whether the currently received layer has update regions, for example, whether gray values of corresponding coordinate positions have changed.

The properties of the visible regions may include whether visible regions are null (generally, a visible region is rectangular, and when the coordinate values of four vertexes of the visible region are the same, it is determined that the visible region is null), the number of the visible regions, the shape of the visible regions, the size of the visible regions, the positions of the visible regions, and so on. The properties of the transparent regions may include the number of the transparent regions, the shape of the transparent regions, the size of the transparent regions, the positions of the transparent regions, relative positions corresponding to visible regions of another layer. The properties of the update regions may include the number of the update regions, the positions of the update regions, the shape of the update regions, the size of the update regions, and ratios of the size of the update regions to the size of a display screen of the terminal, and so on. The image information may include whether an image is plain (color data is zero), level, contrast, hue, brightness, saturation, transparency, ambiguity, and so on.

The above illustrates various layer properties. Any combination of the layer properties may be employed for scene determination. By further employing the layer properties to determine the scene currently displayed on the terminal, the scene may be determined more accurately.

In at least one alternative implementation, the scene currently displayed on the terminal may be determined based on the parameters when one of the process identifiers of the currently operating application is contained in a preset list. That is, the preset list records different process identifiers. When one process identifier of the currently operating application is contained in the preset list, it indicates that the scene currently displayed on the terminal needs to be determined, otherwise, it indicates that the scene currently displayed on the terminal does not need to be determined, which may reduce consumption of system resources for determining the scene currently displayed on the terminal. For example, when a game application is currently operating, the scene currently displayed on the terminal may need to be determined since scenes provided by the game application may change frequently, and when a text application is currently operating, the scene currently displayed on the terminal may not need to be determined since scenes provided by the text application do not change frequently.

In at least one alternative implementation, the method may further include performing one or more corresponding operations on layers of the currently operating application according to the scene currently displayed on the terminal.

A target drawing frame rate, a target composition frame rate, a target refresh rate may be determined according to the scene currently displayed on the terminal. One or more corresponding operations may be performed on the layers of the currently running application according to the target drawing frame rate, the target composition frame rate, and the target refresh rate.

A drawing frame rate is a frame rate to perform a layer drawing operation, and it may indicate layer frames are drawn in a unit time (for example, one second). The drawing frame rate may include a drawing frame rate of an application and a drawing frame rate of a layer. Each application may include multiple layers. For example, a video player may include three layers: a layer for displaying video content which is defined as U1 and two layers of SurfaceView type, one is for displaying bullet content which is defined as U2, and the other is for displaying user interface widgets (for example, a progress bar, a volume control bar, various control buttons, and so on) and broadcasts which is defined as U3. The drawing frame rate of an application is the number of times that the application executes the layer drawing operation in a unit time. When one layer drawing operation is performed, one or more layers may be drawn.

The target drawing frame rate may be a maximum drawing frame rate in which the currently running application draws layers. Performing the one or more corresponding operations on the layers of the currently running application according to the target drawing frame rate may be that a frequency of a reference signal (Vsync signal described below) transmitted to the currently running application is changed to be the target drawing frame rate.

A composition frame rate is a frame rate in which the layers drawn by an application is composed as a to-be-displayed image, and the composition frame rate can be understood to be the number of image frames composed in a time unit.

The target composition frame rate may be a maximum composition frame rate in which a layer composition unit of the terminal performs a layer composition operation. Performing the one or more operations on the layers of the currently running application according to the target composition frame rate may be that a frequency of a reference signal (Vsync signal described below) transmitted to the image composition unit is changed to be the target composition frame rate.

Generally, the terminal will refresh the displayed image in the refresh rate of 60 Hz.

Figure 2:
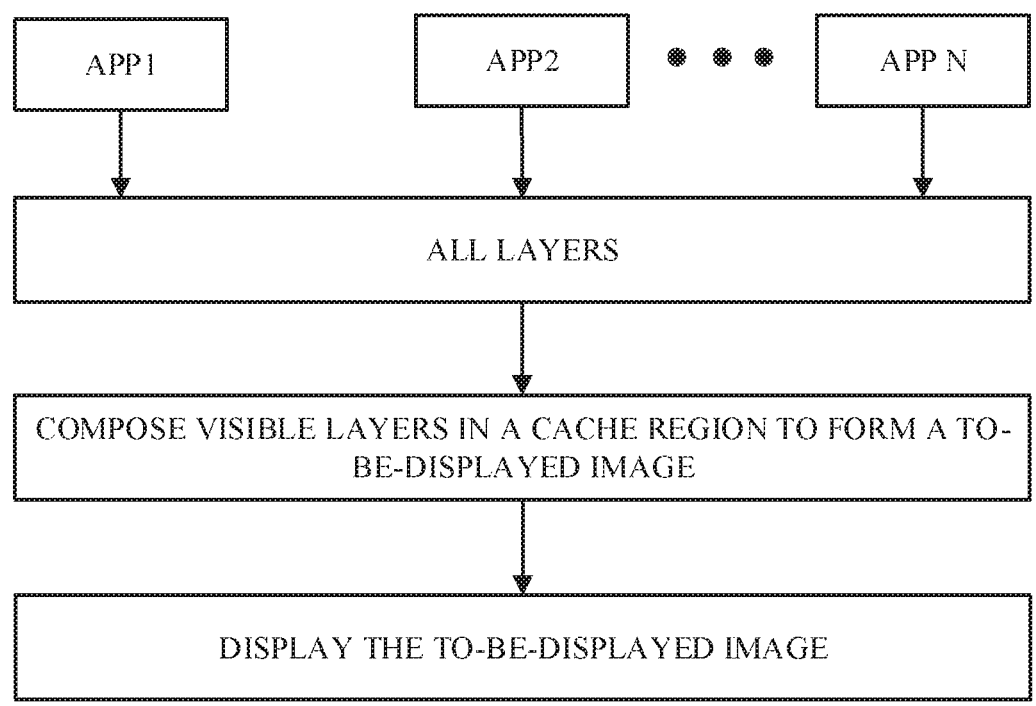
Figure 3:
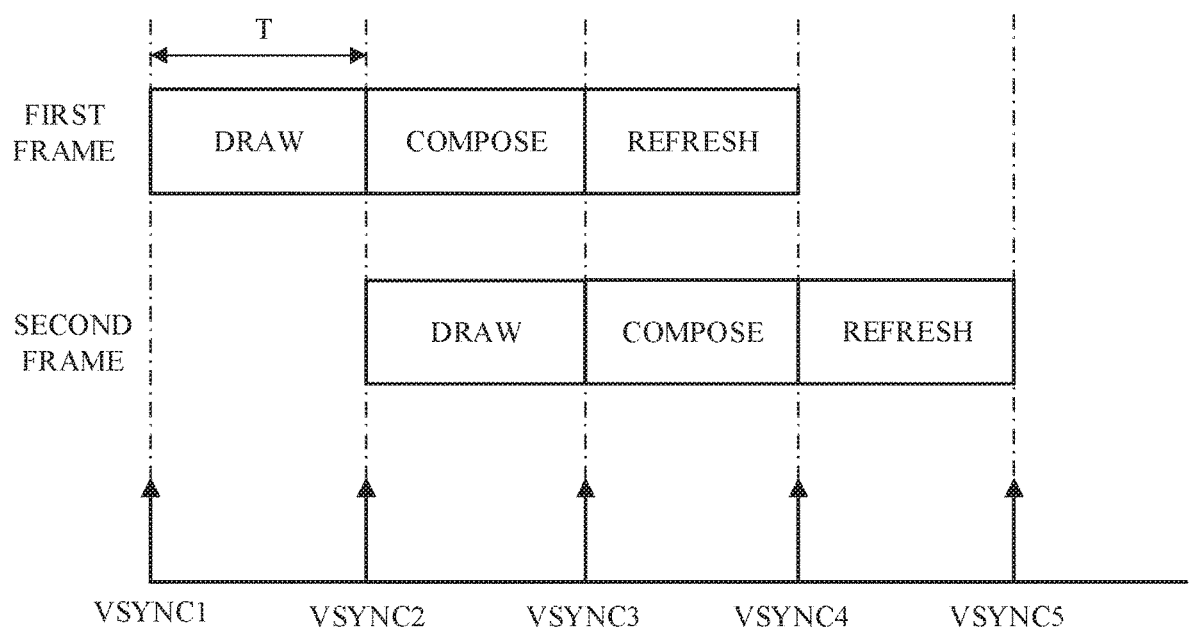

The follows will specifically illustrate the one or more corresponding operations performed on the layers of the currently running application in conjunction with FIG. 2 and FIG. 3.

Referring to FIG. 2, each application may include one or more layers. An application executes a layer drawing operation (that is, drawing images on layers) based on a corresponding installation package. After the layer drawing operation, the application transmits the layers to the layer composition unit to perform the layer composition operation.

In the framework layer, all layers (including visible layers and invisible layers) constitute a layer list defined as ListAll. The layer composition unit selects the visible layers to form a visible layer list defined as DisplayList. The layer composition unit selects an unoccupied frame buffer (FB) from three FBs which are used in turn, and in the unoccupied FB the layers of the DisplayList are laminated together to obtain a to-be-displayed image based on application configuration information. The application configuration information may include which layer is on the bottom, which layer is on the top, which region is visible, which region is transparent, and so on.

Finally, in a kernel layer, the to-be-displayed image is transmitted to a display hardware (including a display controller and the display screen) to display the to-be-displayed image.

Figure 4:
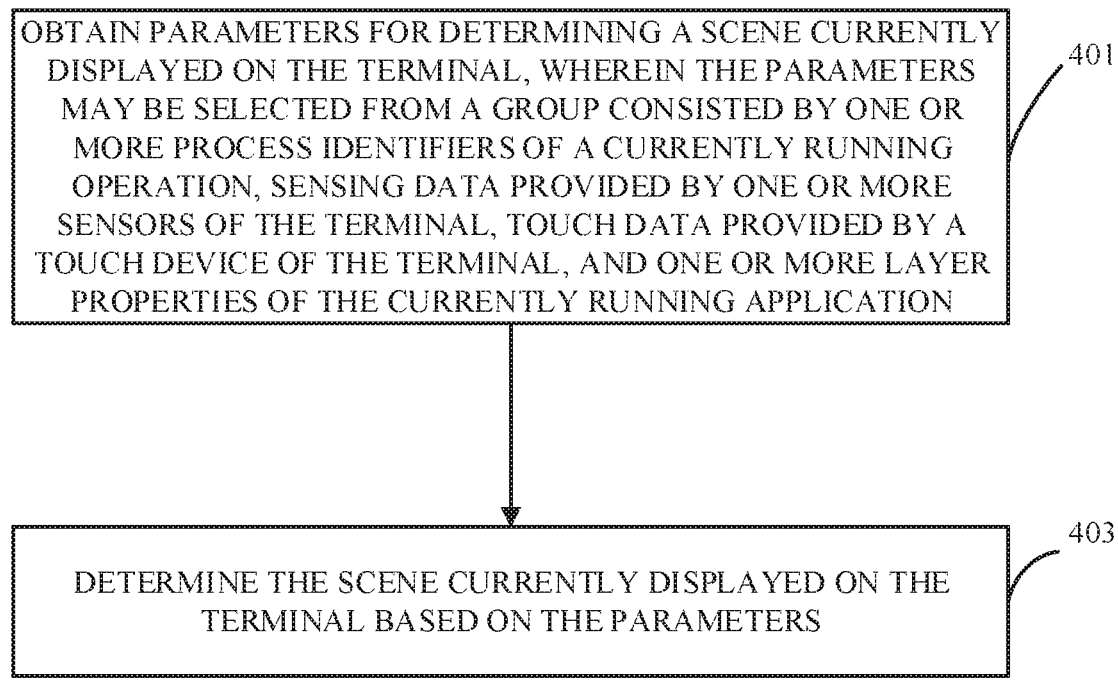

Referring to FIG. 3, a Vsync display refresh mechanism is displayed. The Vsync display refresh mechanism is that in a display process (e.g., the whole display process), Vsync signals are inserted and transmitted to a central processing unit (CPU) via the display controller to generate Vsync interrupts, such that each layer drawing operation and each layer composition operation are needed to be performed according to the Vsync signals, whereby at least some operations (e.g., key operations) of the display process belong to a Vsync management mechanism. The frequency of the Vsync signal is 60 Hz. As illustrated in FIG. 4, it is assumed that the period of the Vsync signal is T, without consideration of transmission delay, after a first Vsync signal (Vsync1) reaches the CPU, the CPU transmits the Vsync1 to the currently running application. The currently running application responds to a user operation such as a sliding operation to begin the layer drawing operation. After the layer drawing operation, multiple layers are obtained. After a second Vsync signal (Vsync2) reaches the CPU, the CPU transmits the Vsync2 to the layer composition unit, and the layer composition unit begins to execute the layer composition operation to generate a to-be-displayed image. After a third Vsync signal (Vsync3) reaches the CPU, the refresh operation is executed to display the to-be-displayed image on the display screen. For the above description, it can be known that the frequencies of the Vsync signals received by the currently running application, the layer composition unit, and the display screen are the same.

In at least one alternative implementation, the method may further include adjusting the brightness of the display screen of the terminal according to the scene currently displayed on the terminal. For example, the brightness of the display screen is adjusted to be low when the scene currently displayed on the terminal may be a text editing scene, thus power may be saved. For another example, the brightness of the display screen is adjusted to be high when the scene currently displayed on the terminal may be a game scene, thus user experience may be improved.

FIG. 4 is a flowchart of a method for determining a scene currently displayed on a terminal in accordance with an implementation of the present disclosure. The method may include the follows.

At block 401, parameters for determining a scene currently displayed on the terminal are obtained. The parameters may be selected from a group consisting of one or more process identifiers of a currently running operation, sensing data provided by one or more sensors of the terminal, touch data provided by a touch device of the terminal, and one or more layer properties of the currently running application.

In an implementation, the parameters may be one or more process identifiers of the currently running operation and the sensing data provided by one or more sensors of the terminal.

In at least one alternative implementation, the parameters may be one or more process identifiers of the currently running operation, the sensing data provided by one or more sensors of the terminal, and the touch data sensed by the touch device of the terminal.

In at least one alternative implementation, the parameters may be one or more process identifiers of the currently running operation, the sensing data provided by one or more sensors of the terminal, and one or more layer properties of the currently running application.

In at least one alternative implementation, the parameters may be one or more process identifiers of the currently running operation, the sensing data provided by one or more sensors of the terminal, the touch data sensed by the touch device of the terminal, and one or more layer properties of the currently running application.

At block 403, the scene currently displayed on the terminal may be determined based on the parameters.

Figure 5:
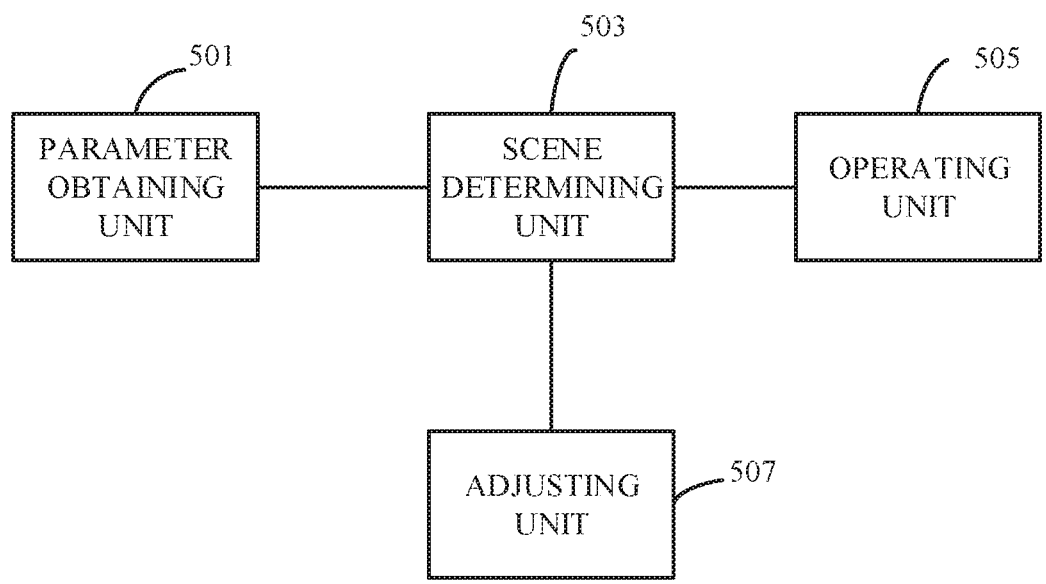

FIG. 5 is a block diagram of a terminal in accordance with an implementation of the present disclosure. The terminal may include a parameter obtaining unit 501 and a scene determining unit 503.

The parameter obtaining unit 501 may be configured to obtain parameters for determining a scene currently displayed on the terminal. The parameters may include one or more process identifiers of a currently running application and sensing data provided by one or more sensors of the terminal.

A certain function such as a game function of an application may be realized by one or more processes. By means of one or more process identifiers of an application, a current function may be determined. Thus, one or more process identifiers of the currently operating application may be employed to determine the scene currently displayed on the terminal.

In the implementation, the terminal may include a number of sensors, for example, a distance sensor, a light sensor, an acceleration sensor, a direction sensor, a gyroscope, a temperature sensor, a humidity sensor, and so on. The sensing data provided by one or more of the sensors may be employed to determine the scene currently displayed on the terminal.

In at least one implementation, the one or more sensors which sensing data may be employed to determine the scene currently displayed on the terminal may be selected based on the type of the currently running application. For example, when the currently running application is a game application, the gyroscope may be selected. When sensing data provided by the gyroscope indicates that the terminal is rotated dramatically, it may indicate that the currently displayed scene is a fighting scene. For another implementation, when the currently running application is an application including multiple functions such as a chatting function, a gaming function, and so on, the gyroscope and the acceleration sensor may be employed. When sensing data provided by the gyroscope and the acceleration sensor indicates that the terminal is substantially not moved, it may indicate that the currently displayed scene is a chatting scene.

The scene determining unit 503 may be configured to determine the scene currently displayed on the terminal based on the parameters.

In the implementation, by means of the one or more process identifiers of the currently running application and the sensing data provided by one or more sensors of the terminal, the scene currently displayed on the terminal can be determined.

In at least one alternative implementation, the parameters may further include touch data provided by a touch device of the terminal. The touch device may be a touch panel, a touch screen, or a combination thereof. Different touch events may be determined based on the touch data. For example, the touch events may include a non-touch event, a quick touch event, a slow touch event, and so on. The non-touch event may be that no touch is performed. The quick touch event may be that a finger slides across the touch device quickly. The slow touch event may be that a finger slides across the touch device slowly. The scene currently displayed on the terminal may be determined based on the one or more process identifiers of the currently running application, the sensing data provided by the one or more of the sensors of the terminal, and the sensing data provided by the touch device of the terminal. For example, when the currently running application is a game application, the gyroscope is selected. When it indicates that the terminal is substantially not rotated based on the sensing data provided by the gyroscope and it also indicates that no touch is performed according to the touch data, it may indicate that the scene currently displayed on the terminal is a scene for illustrating a game rather than a fighting scene.

In at least one alternative implementation, the parameter may further include one or more layer properties of the currently running application. The layer properties may include layer identifiers, whether there is cache data, a landscape or portrait mode, properties of visible regions, properties of transparent regions, whether there are update regions, properties of update regions, image information, and so on.

In at least one alternative implementation, the scene currently displayed on the terminal may be determined based on the parameters when one of the process identifiers of the currently operating application is contained in a preset list. That is, the preset list records different process identifiers. When one process identifier of the currently operating application is contained in the preset list, it indicates that the scene currently displayed on the terminal needs to be determined, otherwise, it indicates that the scene currently displayed on the terminal does not need to be determined, which may reduce consumption of system resources for determining the scene currently displayed on the terminal. For example, when a game application is currently operating, the scene currently displayed on the terminal may need to be determined since scenes provided by the game application may change frequently, and when a text application is currently operating, the scene currently displayed on the terminal may not need to be determined since scenes provided by the text application do not change frequently.

In at least one alternative implementation, the terminal may further include an operating unit 505 configured to perform one or more corresponding operations on layers of the currently operating application according to the scene currently displayed on the terminal.

In at least one alternative implementation, the terminal may further include an adjusting unit 507 configured to adjust the brightness of a display screen of the terminal according to the scene currently displayed on the terminal. For example, the brightness of the display screen is adjusted to be low when the scene currently displayed on the terminal may be a text editing scene, thus power may be saved. For another example, the brightness of the display screen is adjusted to be high when the scene currently displayed on the terminal may be a game scene, thus user experience may be improved.

It shall be noted that the terminal described in the device implementation of the present disclosure is illustrated in the form of functional units. The term "unit" used herein shall be taken in the broadest possible sense. Objects for realizing the function of each unit may be an application specific integrated circuit (ASIC), a circuit (e.g., a single circuit), a processor (shared, specific, or chipset) for executing one or more software or hardware procedures in a memory, a combined logic circuit, and/or other appropriate assembly for realizing the above function.

Figure 6:
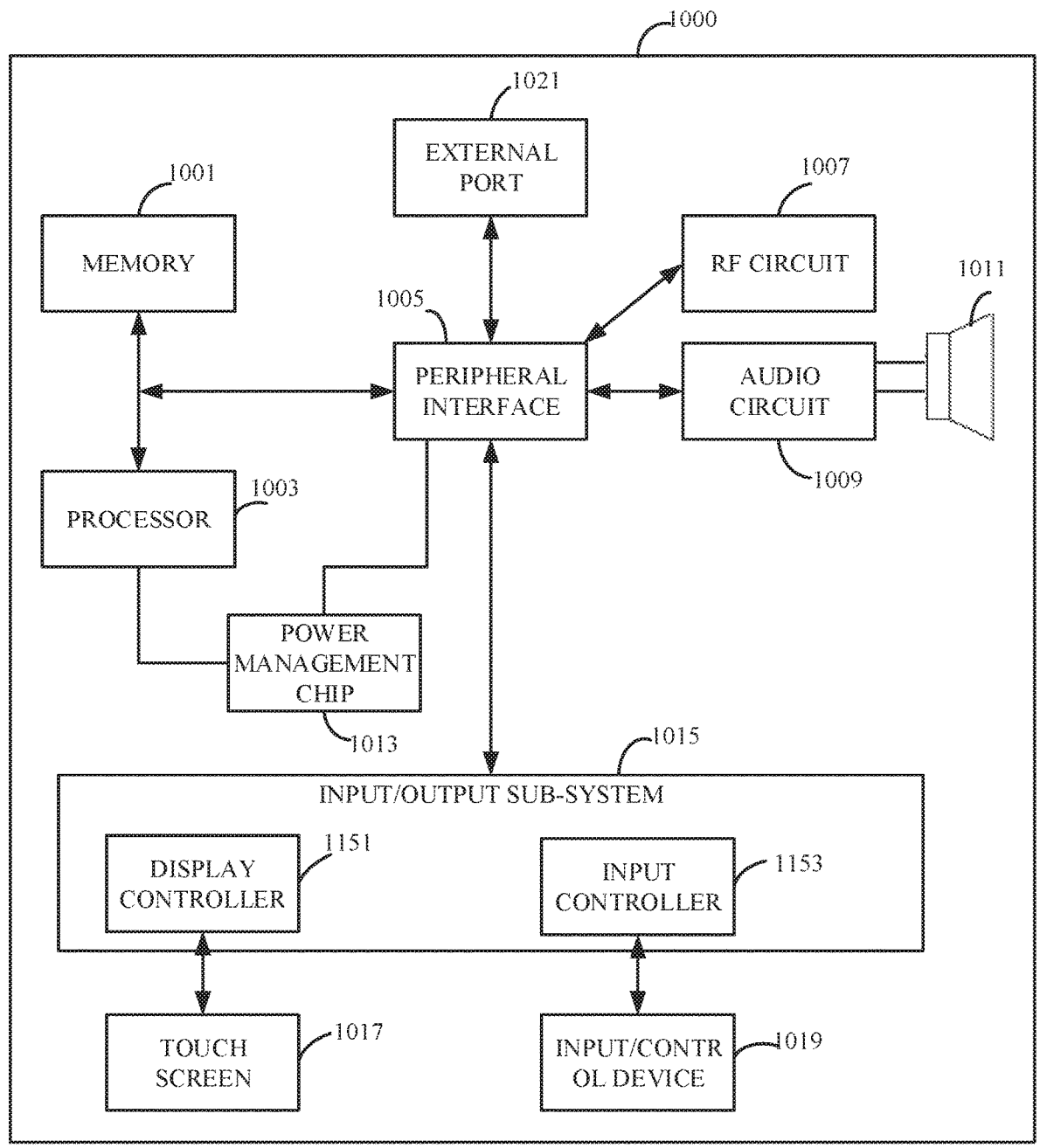

FIG. 6 is a structural view of a terminal in accordance with an implementation of the present disclosure. The terminal 600 may include a memory 601 and a processor 603. The memory 601 stores computer-readable program codes. The memory 601 may be a random access memory, a nonvolatile memory, a disk, and so on. The processor 603 may be configured to invoke the computer-readable program codes to perform the method illustrated in FIG. 1 or the method illustrated in FIG. 4, which will not be repeated herein.

The terminal 600 may further include a peripheral interface 605, a radio frequency (RF) circuit 607, an audio circuit 609, a speaker 611, a power management chip 613, an input/output sub-system 615, a touch screen 617, an input/control device 619, an external port 621, and so on.

The input/output sub-system 615 can couple the touch screen 617 and the input/control device 619 to the peripheral interface 605. The input/output sub-system 615 may include a display controller 6151 and an input controller 6153 which is configured to control the input/control device 619. The input controller 6153 can receive electrical signals from or transmit electrical signals to the input/control device 619. The input/control device 619 may include physical buttons, a sliding switch, a joystick, and so on. The input controller 6153 may be coupled to a keyboard, a universal serial bus interface, a mouse, and so on.

The touch screen 617 may be a capacitance-type touch screen, a resistance-type touch screen, a surface acoustic wave touchscreen, and so on.

The display controller 6151 may receive electrical signals from or transmit electrical signals to the touch screen 617.

The RF circuit 607 may be configured to establish communication between the terminal 600 and a network.

The audio circuit 609 may be configured to receive audio data from the peripheral interface 605, convert the audio data into electrical signals, and transmit the electrical signals to the speaker 611.

While the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A method for determining a scene currently displayed on a terminal, comprising:
   determining that a type of a scene of a foreground application that is currently displayed on the terminal is required to be detected when at least one process identifier of the foreground application is contained in a list stored in the terminal in advance, wherein the list contains a plurality of process identifiers;

determining, in response to that the type of the scene of the foreground application is required to be detected, a type of the foreground application according to the at least one process identifier;

determining, according to the type of the foreground application, a type of sensing data that is used to determine the type of the scene of the foreground application, and obtaining, according to the type of sensing data, corresponding sensing data from at least one sensor of the terminal;

determining the type of the scene of the foreground application according to the corresponding sensing data; and adjusting brightness of a display screen of the terminal according to the scene of the foreground application.

2. The method of claim 1, further comprising:
performing at least one corresponding operation on layers of the foreground application according to the scene of the foreground application.

3. A terminal, comprising:
a memory configured to store computer-readable program codes; and
a processor configured to invoke the computer-readable program codes to:
determine that a type of a scene of a foreground application that is currently displayed on the terminal is required to be detected when at least one process identifier of the foreground application is contained in a list stored in the terminal in advance, wherein the list contains a plurality of process identifiers;
determine, in response to that the type of the scene of the foreground application is required to be detected, a type of the foreground application according to the at least one process identifier;
determine, according to the type of the foreground application, a type of sensing data that is used to determine the type of the scene of the foreground application, and obtain, according to the type of sensing data, corresponding sensing data from at least one sensor of the terminal;
determine the type of the scene of the foreground application according to the corresponding sensing data; and
adjust brightness of a display screen of the terminal according to the scene of the foreground application.

4. The terminal of claim 3, wherein the processor is further configured to invoke the computer-readable program codes to:

perform at least one corresponding operation on layers of the foreground application according to the scene of the foreground application currently displayed.

5. A terminal comprising:
a memory configured to store computer-readable program codes; and
a processor configured to invoke the computer-readable program codes to:
determine that a type of a scene of a foreground application that is currently displayed on the terminal is required to be detected when at least one process identifier of the foreground application is contained in a list stored in the terminal in advance, wherein the list contains a plurality of process identifiers;
determine, in response to that the type of the scene of the foreground application is required to be detected, a type of the foreground application according to the at least one process identifier;
determine, according to the type of the foreground application, a type of sensing data that is used to determine the type of the scene of the foreground application, and obtain, according to the type of sensing data, corresponding sensing data from at least one sensor of the terminal;
determine the type of the scene of the foreground application according to at least the corresponding sensing data and touch data provided by a touch device of the terminal; and
adjust brightness of a display screen of the terminal according to the scene of the foreground application.

6. The terminal of claim 5, wherein the processor configured to invoke the computer-readable program codes to determine the type of the scene of the foreground application according to at least the corresponding sensing data and the touch data provided by the touch device of the terminal is configured to determine the type of the scene of the foreground application according to the corresponding sensing data, the touch data provided by the touch device of the terminal, and at least one layer property of the currently running application.

7. The terminal of claim 5, wherein the processor is further configured to invoke the computer-readable program codes to:
perform at least one corresponding operation on layers of the foreground application according to the scene of the foreground application.

* * * * *